US011518969B2

(12) United States Patent
Groeneveld et al.

(10) Patent No.: US 11,518,969 B2
(45) Date of Patent: Dec. 6, 2022

(54) WASTE BEER RECOVERY

(71) Applicant: University of South Africa, Pretoria (ZA)

(72) Inventors: Steven Craig Groeneveld, Roodepoort (ZA); John Dewar, Florida Ext 2 (ZA)

(73) Assignee: University of South Africa, Pretoria (ZA)

( * ) Notice: Subject to any disclaimer, the term of this patent is extended or adjusted under 35 U.S.C. 154(b) by 663 days.

(21) Appl. No.: 15/573,819

(22) PCT Filed: May 16, 2016

(86) PCT No.: PCT/IB2016/052820
§ 371 (c)(1),
(2) Date: Nov. 13, 2017

(87) PCT Pub. No.: WO2016/181370
PCT Pub. Date: Nov. 17, 2016

(65) Prior Publication Data
US 2018/0258376 A1    Sep. 13, 2018

(30) Foreign Application Priority Data

May 14, 2015   (ZA) ................... 2015/03384

(51) Int. Cl.
C12H 1/16      (2006.01)
C12C 11/00     (2006.01)
C12H 1/065     (2006.01)

(52) U.S. Cl.
CPC ........... *C12H 1/165* (2013.01); *C12C 11/003* (2013.01); *C12H 1/061* (2013.01)

(58) Field of Classification Search
CPC .... C12H 1/0408; C12H 1/0416; C12H 1/165; C12H 1/061; C12C 11/003; C12C 11/11
USPC .......................................... 426/16
See application file for complete search history.

(56) References Cited

U.S. PATENT DOCUMENTS

| | | | | |
|---|---|---|---|---|
| 1,898,047 A | * | 2/1933 | Glaubitz | C12G 3/021 426/16 |
| 2,816,031 A | * | 12/1957 | Specht | C12C 7/205 426/16 |
| 4,867,991 A | * | 9/1989 | Swinkels | C12H 1/061 426/16 |
| 4,880,650 A | * | 11/1989 | Okamura | C12H 1/0408 426/330.4 |
| 2002/0106422 A1 | * | 8/2002 | McGarrity | C12C 7/28 426/29 |
| 2009/0294688 A1 | * | 12/2009 | Evans | A23L 3/28 250/436 |

FOREIGN PATENT DOCUMENTS

| | | |
|---|---|---|
| CN | 102796637 B | 2/2014 |
| CN | 201680027711 A | 3/2018 |
| DE | 2261238 A1 | 6/1974 |
| DE | 102012207753 A1 | 11/2013 |
| GB | 2362891 A | 12/2001 |
| JP | 2004201535 A | 7/2004 |
| JP | 2018511540 A | 4/2018 |
| WO | 2016040967 A1 | 3/2016 |
| WO | 2016181370 A1 | 11/2016 |

OTHER PUBLICATIONS

NPL Joules, Retrieved on Jul. 16, 2020. (Year: 2020).*
NPL Yoshida et al. (in Beer Health and Disease Prevention pp. 815-829, 2005). (Year: 2005).*
NPL Sheraz et al. (in Photo, thermal and chemical degradation of riboflavin, Beilstein J. Org. Chem. 2014, 10, 1999-2012.) (Year: 2014).*
Google Search (Retrieved on Feb. 11, 2022). (Year: 2022).*
Montague-Jones, Guy, "SAB starts using UV light to purify beverage ingredients", Mar. 2, 2011, pp. 2-3. Retrieved at http://www.foodproductiondaily.com/Processing/SAB-starts-using-UV-light-to-purify-beverage-ingredients, Accessed Nov. 13, 2015.
International Search Report and Written Opinion for PCT/IB2016/052820 dated Aug. 8, 2016, 9 pages.
International Preliminary Report on Patentability for PCT/IB2016/052820, dated May 17, 2017, 12 pages.
Nyumon, Sakerui, Beginner's Guide to Alcoholic Drinks, The Japan Food Journal, 1987, 4th Edition, pp. 170-172. English translation not available.
Technologie Brauer & Mälzer, Wolfgang Kunze, China Light Industry Press (published on Sep. 2008, p. 374) (English translation of relevant parts).
"Q&A of Beer Production (Revised Version)", Xu Bin, China Light Industry Press (published on Jun. 1998, pp. 405-406) (English translation of relevant parts).
"Ultraviolet Sterilization of Beer", Cui Haibo, Chinese Master's Theses Full-text Database, (published on May 2011, pp. 45-47) (English translation of relevant parts).

* cited by examiner

Primary Examiner — Donald R Spamer
Assistant Examiner — Bhaskar Mukhopadhyay
(74) Attorney, Agent, or Firm — Denise L. Mayfield; Dykema Gossett PLLC

(57) ABSTRACT

This invention relates to a method for recovering beer during a beer brewing process. In the method, yeast entrained in beer 36 is recovered from a fermentation step 32. The yeast is separated from the beer to provide recovered beer 42. The recovered beer 42 is passed through an ultraviolet (UV) photo-sterilization unit 46, to provide sterilized recovered beer 48 which is recycled to the fermentation step 32. The invention uses ultraviolet light to achieve a microbially safe beer recovered from surplus yeast, and the recovered beer is recycled back to the brewing process, thereby saving financially as well as water loss.

10 Claims, 1 Drawing Sheet

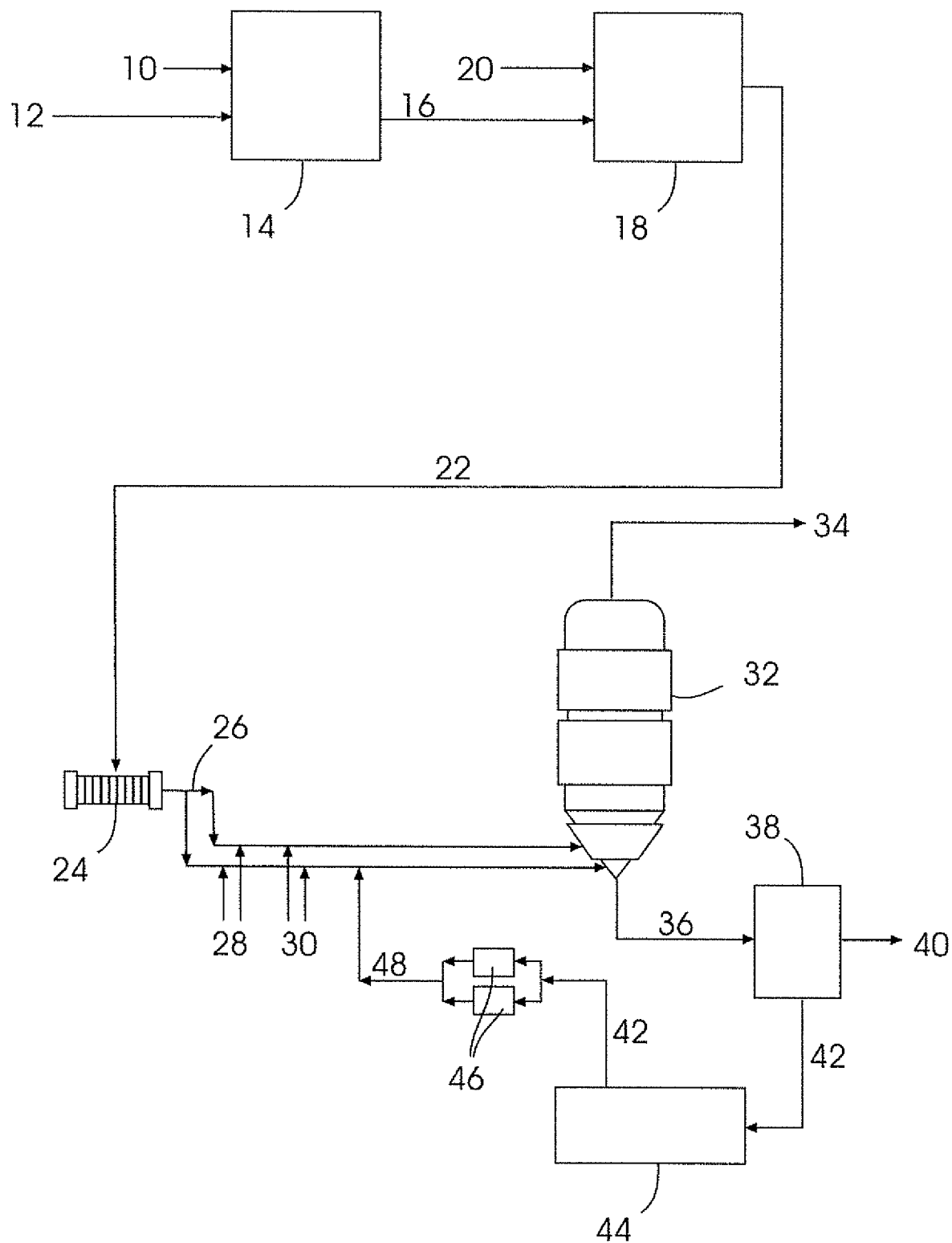

WASTE BEER RECOVERY

BACKGROUND OF THE INVENTION

THIS invention relates to a method for the recovery of beer from spent yeast.

Beer production is a water-intensive process with a target of 350 litres of water to produce 100 litres of beer. This means that beer-loss during the process equates to three times the loss of water used during the processing. One area within the brewing process where beer is lost is during excess yeast removal. For each 1000 ml of yeast removed, up to 400 ml of beer is wasted. There is existing technology that allows for the recovery of beer from surplus yeast with the recycling of the recovered beer into the process. The problems with the recycling of recovered beer are negative flavour impact, negative flavour stability impact and microbial contamination with beer added back post fermentation.

It is an object of this invention to provide an improved method for reclaiming waste beer from a brewing process.

SUMMARY OF THE INVENTION

According to the present invention there is provided a method for the recovery of alcoholic liquid separated from yeast entrained in alcoholic liquid after a fermentation process, wherein the separated alcoholic liquid is recycled to the fermentation process.

Preferably, the separated alcoholic liquid is sterilized with ultraviolet light prior to introduction to the fermentation process.

The separated alcoholic liquid may be sterilized with ultra violet light at a wavelength of 200 to 400 nm, preferably 250 to 300 nm, more preferably 254 to 256 nm typically 254.9 nm.

In the preferred method of the present invention is a method for recovering beer during a beer brewing process including the following steps:
  a) boiling a wort;
  b) cooling the boiled wort to obtain a cooled wort;
  c) combining the cooled wort with yeast and fermenting the wort in a fermentation process to produce a beer liquid product containing alcohol;
  d) recovering yeast entrained in beer from the fermentation process;
  e) separating yeast from the beer to obtain a recovered beer containing alcohol;
  f) sterilizing the recovered beer containing alcohol with ultraviolet light; and recycling sterilized recovered beer to the fermentation step.

The beer may be separated from the yeast via centrifugation.

Typically, the wort is cooled to a temperature of 5 to 30° C., preferably 5 to 20° C., most preferably 5 to 10° C.

The recovered beer containing alcohol may be sterilized with ultra violet light at a wavelength of 200 to 400 nm, preferably 250 to 300 nm, more preferably 254 to 246 nm, typically 254.9 nm.

Preferably, the recovered beer containing alcohol is sterilized with ultra violet light to at an exposure of 25 to 3000 J/L, more preferably 100 to 2000 J/L, most preferably 200 to 1000 J/L.

BRIEF DESCRIPTION OF THE DRAWING

The drawing is a flow-diagram of a process of brewing beer using a method according to the present invention.

DESCRIPTION OF AN EMBODIMENT OF THE INVENTION

With reference to the drawing, in a brewing process a starch source (typically malted barley) 10 is mixed with water 12 in a mashing vessel 14, and heated in a mashing step, to provide sugar-rich water which is strained from the starch to produce a wort 16. The wort 16 is added to a brewing vessel 18 and is boiled in a brewing step. During this brewing step, hops 20 is added to create the bitterness, flavour and aroma of beer. After brewing, the boiled wort 22 is filtered and passed through a cooler 24 to produce a cooled wort 26. Typically the cooled wort 26 has a temperature of about 5 to 30° C. Oxygen 28 and yeast 30 may be added to the cooled wort 26 which is passed to a fermentation vessel 32 where the cooled wort 26 undergoes a fermentation step. In the fermentation step, the yeast ferments sugars from the malt to produce alcohol. When the sugars have almost been completely digested, fermentation slows down and the yeast starts to settle in the bottom of the vessel 32. After the fermentation process, fermented beer product 34 is removed with yeast remaining entrained in beer in the bottom of the vessel 32. Yeast entrained in beer 36 is harvested from the vessel fermentation 32. The harvested yeast entrained in beer will consist of approximately 60% yeast and 40% beer, by mass. This makes up approximately 3% of the beer from the batch process. The yeast entrained in beer 36 is sent to a separation device 38 which separates yeast 40 from the recovered beer 42, The separation device 38 is typically a cyclone which separates the yeast by centrifugation. The recovered beer 42 is then stored in a storage vessel 44. The problem with this recovered beer 42 is that it is not suitable for consumption, and it is problematic trying to get this recovered beer 42 back into the brewing process. The following problems are found:
  1. The recovered beer 42 has poor flavour and flavour stability properties.
  2. The recovered beer 42 may act as a source of microbial contamination.
  3. The recovered beer may have poor foam potential.

It has been proposed before to reprocess the recovered beer 42 before the brewing (hot) step in the brewing vessel 18. This has the benefit of destroying any microbes that may have developed, but the alcohol content is lost during this process.

According to the present invention, recovered beer 42 is passed through an ultraviolet (UV) photo-sterilization unit 46 where the recovered beer 42 is sterilized with UV light at a wavelength of 254.9 nm which is enough to disrupt DNA and prevent the growth and replication of microbes. A suitable photo-sterilization unit 46 is described in U.S. Pat. No. 6,916,452, the content of which is incorporated herein by reference. The photo-sterilization unit 46 is described in U.S. Pat. No. 6,916,452 comprises an elongate sheath, having a first end, a second end, and a central axis; an elongate fluorescent tube extending along said sheath, there being a gap between said tube and said sheath through which liquid flows. The sheath has a surface facing toward the fluorescent tube. This surface includes protuberances over which the liquid flows, thereby imparting turbulence to the flowing liquid. The protuberances are formed from a smoothly curved spiral groove on the surface. An inlet manifold is connected to the first end of the elongate sheet. The inlet manifold has an inlet port for the liquid. The inlet port is offset from the central axis of the elongate sheet in order to impart rotational flow to the liquid as it flows into the elongate sheath. Typically, the photo-sterilization unit 46 is operated to deliver 100 Joules per Litre per product pass, and the recovered beer 42 circulated at 2000 L/hr for 2 hours to achieve a 120 000 J/L exposure.

By making use of UV light, the energy costs are negligible since the sterilization takes place without the introduction of heat. Capital costs are recovered via energy savings. Sterilized recovered beer 48 is then combined with cooled wort 26 and recycled to the fermentation step in the fermentation vessel 32. Beer brewers historically avoided the use of ultraviolet light in any product that contains Isohumulone from hops as a combination of ultraviolet light and Isohumulone facilitated by Riboflavin results in the formation of Lightstruck off flavours (elevated levels of 3-MBT). However, the introduction of the sterilized beer prior to fermentation negates this phenomenon. Furthermore, the addition of the recycled beer after the boiling step, means that the alcohol content of the recycled beer is maintained.

The process of the present invention accordingly uses ultraviolet light to achieve a microbially safe beer recovered from surplus yeast, and the recovered beer is added back to the brewing process, thereby saving financially as well as water loss.

Benefits of the process of the present invention are:
1. It does not negatively impact upon beer flavour.
2. It does not negatively impact on beer flavour stability.
3. It does not negatively impact on the microbial integrity of the final product.
4. It results in a water/beer saving of between 1% and 1.5% of the volume of the beer batch The following financial benefits may be achieved in the production of 28 28 million hL of beer.

Ferment vessel beer loss=3%
Yeast pitching rate=1 kg/hL (approximate removal at 3.5 kg/hL)
Beer recovery efficiency=40%
Example cost of ferment beer R145/hL
Savings from recovery=R 36 046 608.61 per annum or R1.20/hL packed.

Although the method of the invention has been described in relation to beer production, the method applies to all processes for the production of alcoholic beverages that make use of a boiling and a fermentation step, for example the production of cider.

The invention will be described in more detail with reference to the following Example.

Example

A 200 Litre conventionally hopped ale was brewed and fermented via standard brewing practice. The resultant beer displayed a happy and slightly bitter character (from the hops) with notes of caramel from the speciality malt used. Once fermentation was complete the contents of the Ferment Vessel (FV) were cooled to 8° C. to allow for some flocculation of yeast. The spent yeast was removed via the bottom FV outlet valve. Recovered beer separated from the spent yeast was then sterilized with U Ultraviolet light in a photo-sterilization unit as described in U.S. Pat. No. 6,916,452. The dosage of Ultraviolet light was achieved by connecting a supply and return hose from the FV to photo-sterilization unit delivering 100 Joules per Litre per product pass. The hoses and unit were CIP'd prior to the trial to prevent any microbial contamination. The beer was circulated at 2000 L/hr. through this unit for 2 hours with no measure of the total UV exposure (this is calculated as 120 000 J/L exposure). This is a massive dose of UV light and is expected to have yielded beer which could not become any more Lightstruck.

The product was organoleptically assessed as Lightstruck, burnt, scorched and beyond repair.

This beer was then primed with fermentable extract and repitched with Ale yeast.

Fermentation continued for three days until complete attenuation was achieved. The beer was then sampled for organoleptic evaluation and stored in PET bottles in a refrigerator with control samples which were not UV treated nor re-fermented.

Trial product was assessed organoleptically and no Lightstruck character discerned. This product was stored for 6 months and then tasted again. No Lightstruck off flavour was discerned and the beer was palatable whereas the trial product was Lightstruck (from light exposure in PET) as well as microbially spoiled and unpalatable.

The beer was "maltreated" and heavily overexposed to UV Light resulting in product that consumers would find offensive. It is believed that no additional Lightstruck off flavour could have been generated and the fact that this was reversed via re-fermentation proves that UV photosterilization could be an alternative to Pasteurization since any Lightstruck off flavours can be removed.

The invention claimed is:

1. A method for recovering beer during a beer brewing process consisting of including the following steps:
   a) boiling a wort in a brewing step and adding hops in the brewing step;
   b) cooling the boiled wort to obtain a cooled wort;
   c) combining the cooled wort with yeast and fermenting the wort in a fermentation process to produce a beer liquid product containing alcohol;
   d) recovering yeast entrained in beer from the fermentation process;
   e) separating yeast from the beer to obtain a recovered beer containing alcohol and isohumulone;
   f) sterilizing the recovered beer from step e) with ultraviolet light in a wavelength of 200 to 300 nm at an exposure of 25 to 30000J/L; and
   g) combining the sterilized recovered beer from step f) with the cooled wort at step b) and recycling sterilized recovered beer to the fermentation step c).

2. The method claimed in claim 1, wherein the beer is separated from the yeast via centrifugation.

3. The method claimed in claim 1, wherein the wort is cooled to a temperature of 5 to 30° C.

4. The method claimed in claim 3, wherein the wort is cooled to a temperature of 5 to 20° C.

5. The method claimed in claim 4, wherein the wort is cooled to a temperature of 5 to 10° C.

6. The method claimed in claim 1, wherein the separated alcoholic liquid is sterilized with ultra violet light at a wavelength of 250 to 300 nm.

7. The method claimed in claim 6, wherein the separated alcoholic liquid is sterilized with ultra violet light at a wavelength of 254 to 256 nm.

8. The method claimed in claim 7, wherein the separated alcoholic liquid is sterilized with ultra violet light at a wavelength of 254.9 nm.

9. The method claimed in claim 1, wherein the recovered beer containing alcohol is sterilized with ultra violet light at an exposure of 100 to 2000J/L.

10. The method claimed in claim 9, wherein the recovered beer containing alcohol is sterilized with ultra violet light at an exposure of 200 to 1000J/L.

\* \* \* \* \*